US011946381B2

(12) United States Patent
Perdrigeon et al.

(10) Patent No.: US 11,946,381 B2
(45) Date of Patent: Apr. 2, 2024

(54) STATOR SUPPORT FOR A FAN SHAFT DRIVEN BY A REDUCTION GEARBOX IN A TURBOMACHINE

(71) Applicant: Safran Aircraft Engines, Paris (FR)

(72) Inventors: Christophe Marcel Lucien Perdrigeon, Moissy-Cramayel (FR); Didier Gabriel Bertrand Desombre, Moissy-Cramayel (FR); Régis Eugène Henri Servant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/029,783

(22) PCT Filed: Sep. 24, 2021

(86) PCT No.: PCT/FR2021/051656
§ 371 (c)(1),
(2) Date: Mar. 31, 2023

(87) PCT Pub. No.: WO2022/069824
PCT Pub. Date: Apr. 7, 2022

(65) Prior Publication Data
US 2023/0407763 A1    Dec. 21, 2023

(30) Foreign Application Priority Data

Oct. 1, 2020  (FR) ...................................... 2010071

(51) Int. Cl.
*F01D 25/18* (2006.01)
*F02C 7/06* (2006.01)
*F02C 7/36* (2006.01)

(52) U.S. Cl.
CPC ................ *F01D 25/18* (2013.01); *F02C 7/06* (2013.01); *F02C 7/36* (2013.01); *F05D 2220/32* (2013.01);
(Continued)

(58) Field of Classification Search
CPC . F01D 25/18; F01D 25/16; F02C 7/06; F05D 2240/14; F05D 2240/50
See application file for complete search history.

(56) References Cited

U.S. PATENT DOCUMENTS 7,040,811 B2 * 5/2006 Dusserre-Telmon ....................... F16C 33/6659
384/99
9,810,095 B2 * 11/2017 Morreale ............. F16J 15/3268
(Continued)

FOREIGN PATENT DOCUMENTS

EP    1 375 941 A1    1/2004
FR    3 030 818 A1    6/2016
(Continued)

OTHER PUBLICATIONS

French Search Report for French Application No. 2010071, dated May 26, 2021.
(Continued)

*Primary Examiner* — Eldon T Brockman
(74) *Attorney, Agent, or Firm* — BIRCH, STEWART, KOLASCH & BIRCH, LLP

(57) ABSTRACT

Stator structure (22) extending around an axis of the turbomachine and comprising: —a support (50) having an inner surface centred on the axis and—a flange (60) defining an air chamber (A2) and having an outer surface centred on the axis, the support (50) extending around the flange (60) such that the inner and outer surfaces are opposite to each other, the structure (22) defining an oil circuit and an air circuit which are formed by upstream channels (64, 65) and downstream channels (54, 55), —each upstream channel (64, 65) defining an outer opening in the outer surface, —each downstream channel (54, 55) defining an inner opening in the inner surface, each circuit being oriented between the outer and inner openings in a direction comprising a component radial to the axis.

15 Claims, 6 Drawing Sheets

(52) U.S. Cl.
CPC ...... *F05D 2240/14* (2013.01); *F05D 2240/50* (2013.01); *F05D 2260/98* (2013.01)

(56) References Cited

U.S. PATENT DOCUMENTS

| | | |
|---|---|---|
| 11,085,329 B2 * | 8/2021 | Becoulet ............... F01D 25/162 |
| 2004/0022463 A1 * | 2/2004 | Dusserre-Telmon ....................... F16C 33/6685 384/99 |
| 2016/0305283 A1 | 10/2016 | Morreale et al. |
| 2020/0095890 A1 | 3/2020 | Becoulet et al. |

FOREIGN PATENT DOCUMENTS

| | | | |
|---|---|---|---|
| FR | 3 035 154 | A1 | 10/2016 |
| FR | 3 061 238 | A1 | 6/2018 |

OTHER PUBLICATIONS

International Search Report for International Application No. PCT/FR2021/051656, dated Jan. 14, 2022.

\* cited by examiner

[Fig. 1]
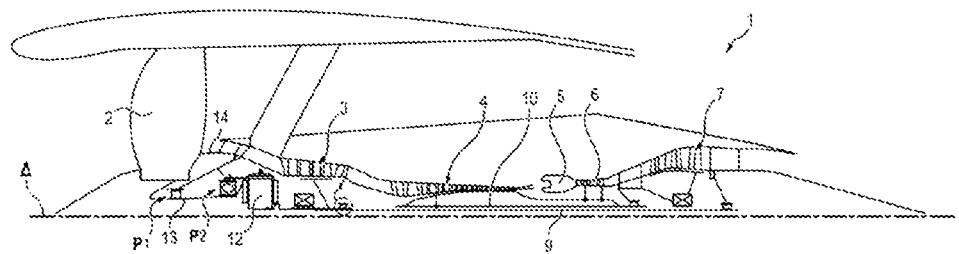
[Fig. 2]
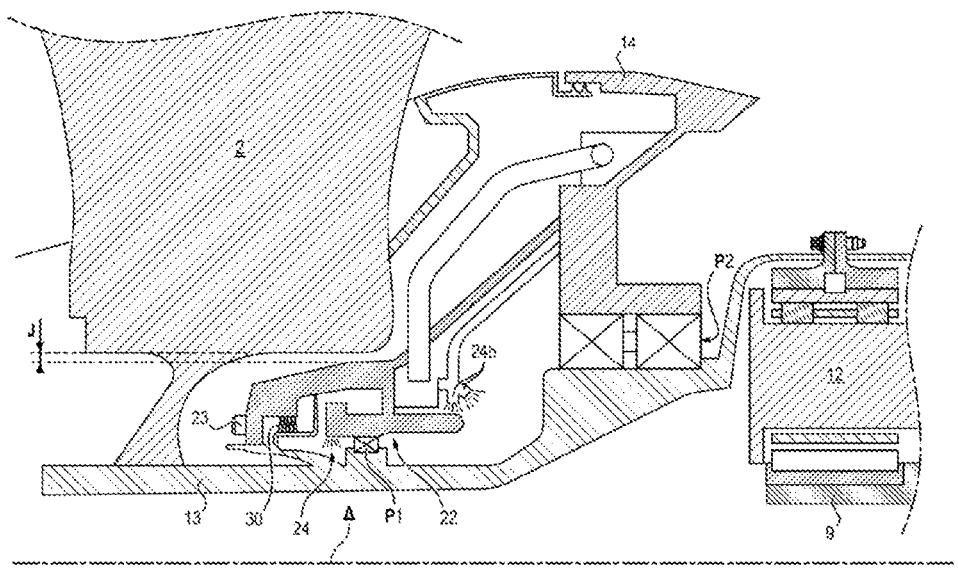

[Fig. 3]
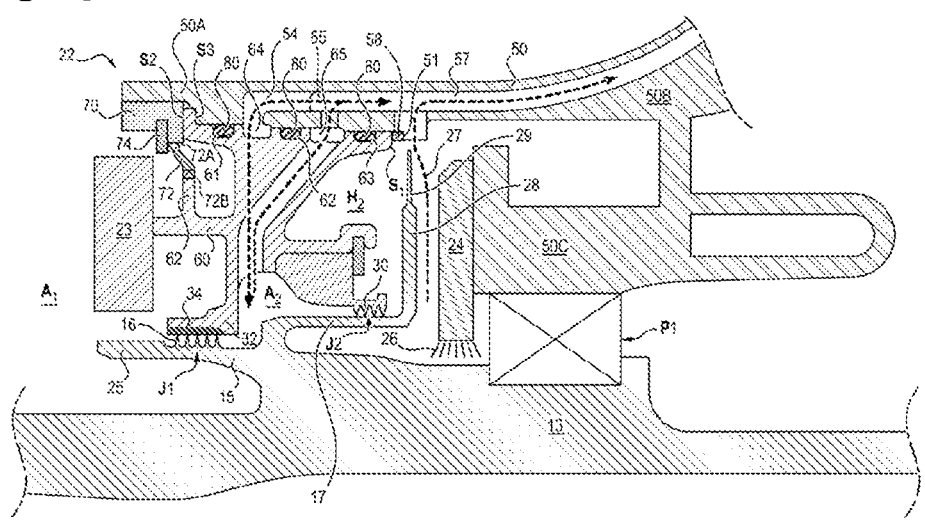

[Fig. 4A]
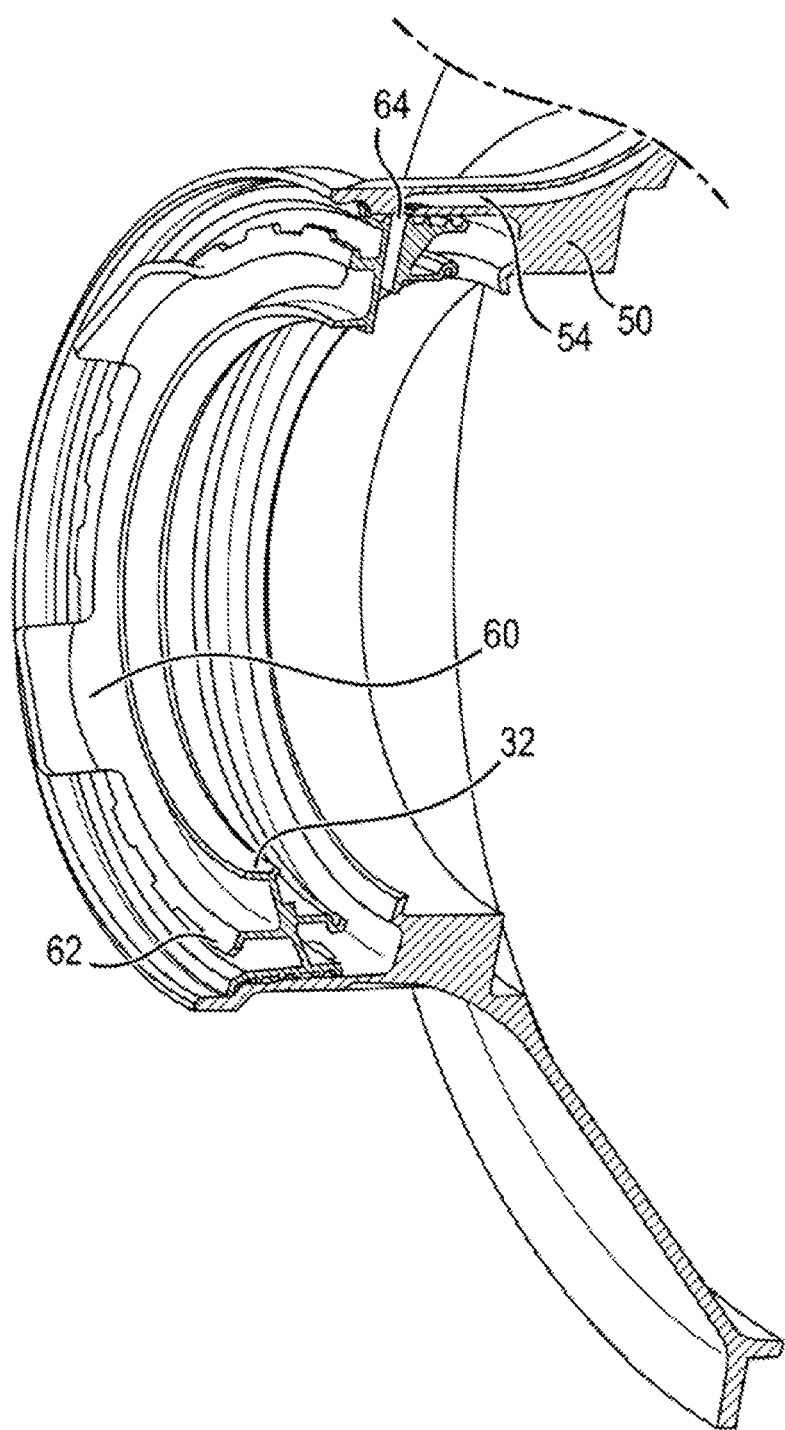

[Fig. 4B]
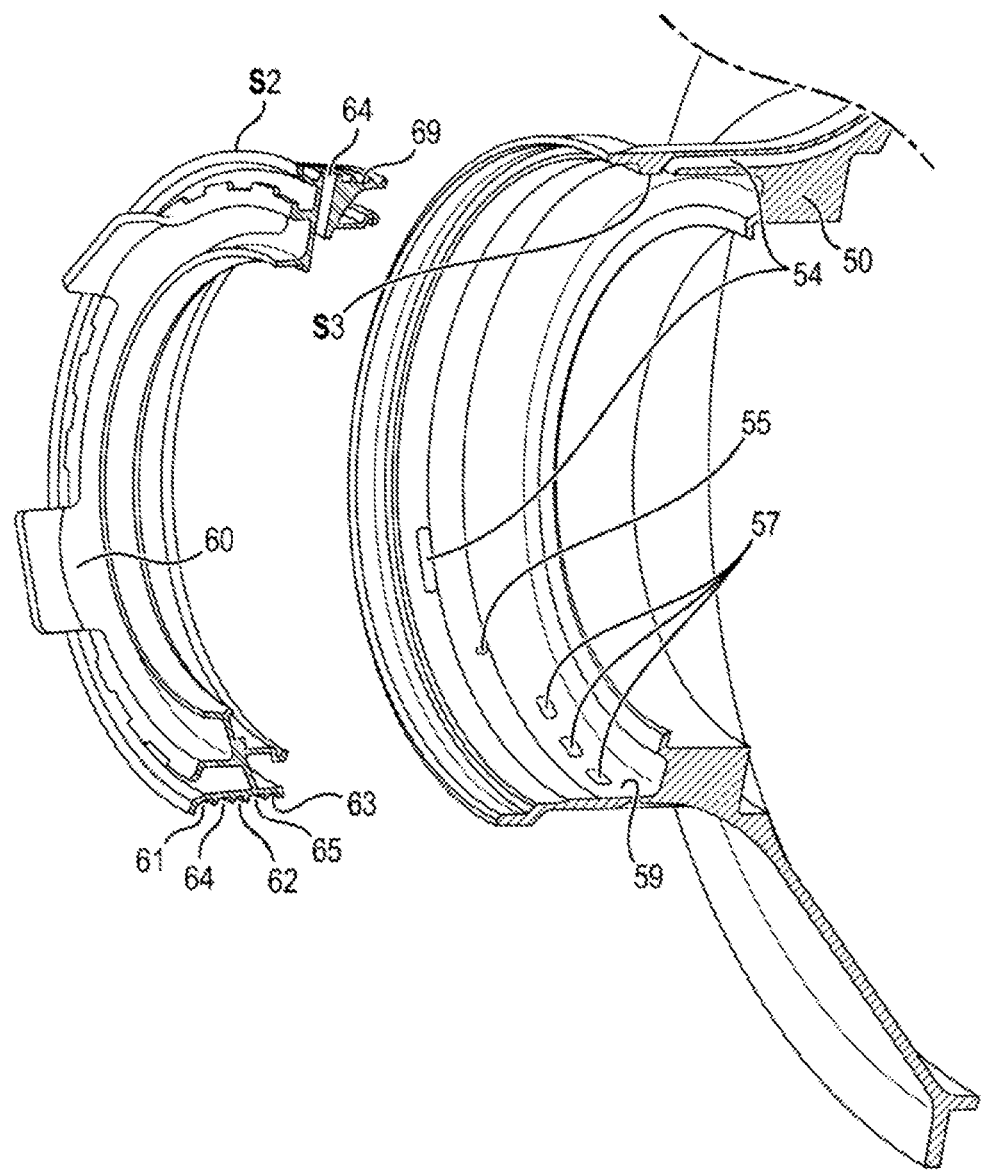

[Fig. 5]
[Fig. 6]
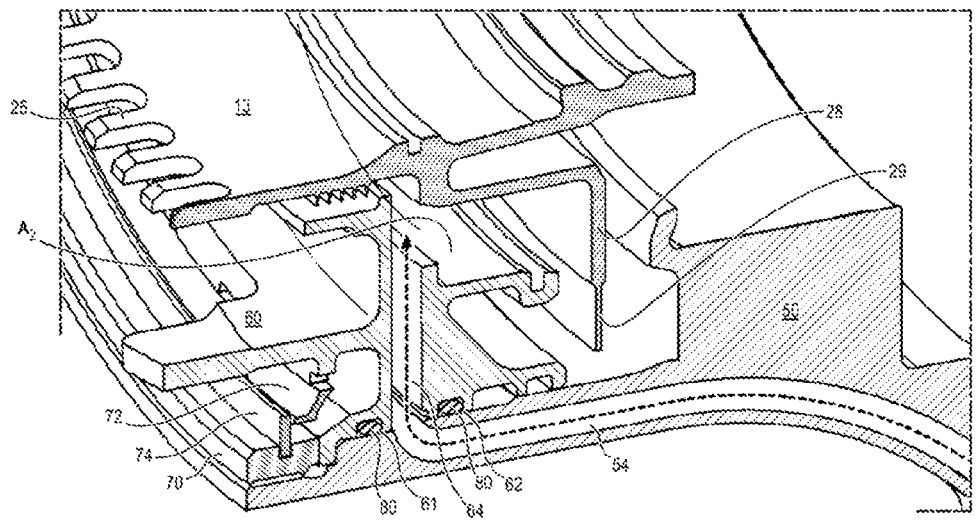

[Fig. 7]
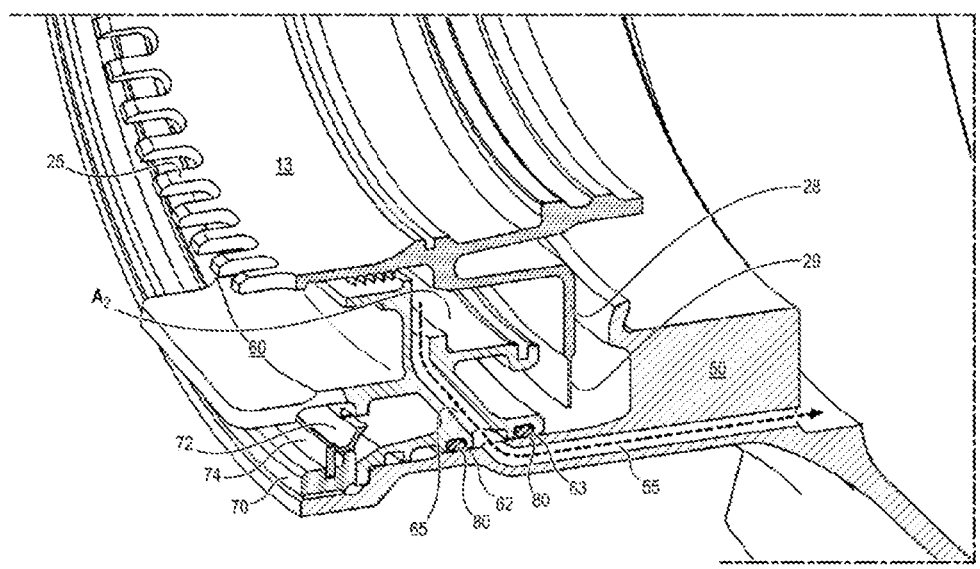

STATOR SUPPORT FOR A FAN SHAFT DRIVEN BY A REDUCTION GEARBOX IN A TURBOMACHINE

FIELD OF THE INVENTION

The present invention relates to turbomachines provided with a fan and particularly aims the support of a fan shaft driving a fan disk in a turbomachine comprising or not comprising a speed reduction gear to drive the fan.

STATE OF THE ART

Referring to FIG. 1, a turbomachine is schematically represented, more specifically an axial turbofan engine 1. The illustrated turbojet engine 1 extends along an axis Δ and successively includes, in the direction of flow of the gases in the turbomachine, the fan 2, a compression section comprising a low-pressure compressor 3 and a high-pressure compressor 4, a combustion chamber 5, and a turbine section comprising a high-pressure turbine 6 and a low-pressure turbine 7, and an exhaust nozzle.

The low-pressure compressor 3 and the input shaft of the reduction gear are driven in rotation by the low-pressure turbine 7 via a first transmission shaft 9, while the high-pressure compressor 4 is driven in rotation by the high-pressure turbine 6 via a second transmission shaft 10. The output shaft of the reduction gear drives in rotation the fan 2.

In operation, an air flow compressed by the low-pressure and high-pressure compressors 3 and 4 supplies a combustion in the combustion chamber 5, in which the expansion of the combustion gases drives the high-pressure and low-pressure turbines 6, 7. The air propelled by the fan 2 and the combustion gases leaving the turbojet engine 1 through the exhaust nozzle exert a reaction thrust on the turbojet engine 1 and, through it, on a vehicle or a machine such as an aircraft.

A speed reduction gearbox 12 is driven by the first transmission shaft 9. It in turn drives a fan shaft 13. The fan disk 2 is rigidly connected to the fan shaft 13 and rotates with a reduced speed of rotation relative to the speed of rotation of the transmission shaft 9.

With reference to FIG. 1, the fan shaft 13 is connected to a stator 14 of the turbomachine by two bearings:
- a bearing P1 ensuring the guiding of the transmission shaft 9, for example a roller bearing comprising a squeeze film damper damping the vibration modes, and
- a bearing P2 taking up the axial thrust force, for example a ball bearing.

The roller and fluid film bearing does not need to be described in the present description because its arrangement is of a known type.

The general architecture with two bearings for the fan shaft associated with a reduction gearbox is known for example in patent FR 3 061 238. In this type of architecture, the space requirement of the reduction gearbox requires positioning the first roller bearing under the fan disk, that is to say in an annular volume inside the disk, as suggested for example in FIG. 2, 3 or 4 of document FR 3 061 238. It is then also necessary in this architecture to place a bearing support which forms part of the stator close to the fan disk. The proximity between these two parts is an additional constraint compared to the architecture of the conventional engines without a reduction gearbox. This architecture also constrains the hub ratio of the fan because the design of a radially compact fan disk is made difficult by the presence of the first roller bearing disposed in the annular volume inside the disk. Indeed, this first bearing located on the upstream side of the second ball bearing necessarily has a radial space requirement which imposes radial compactness constraints on the fan disk. It is in particular difficult to reduce the radial space requirement specific to accommodate the roots of the fan blades by increasing the upstream internal end diameter at the leading edges of the fan blades participating in the definition of the hub ratio.

However, the resulting axial and radial clearances, that is to say the distances separating on the one hand in the direction of the axis and on the other hand in the direction radial to the axis, the bearing support and the fan disk, must allow displacements of the fan disk 2 in case of Fan Blade Out (FBO).

This situation therefore also requires optimizing the clearances between the fan disk and the stator support of the bearing P1.

DISCLOSURE OF THE INVENTION

A general aim of the invention is to make this particular architecture compatible with such displacements of the fan disk.

The aim is achieved in the context of the present invention thanks to a stator structure for a turbomachine, the stator structure extending about an axis in correspondence of an axis of the turbomachine and comprising:
- a support adapted to house a fan shaft bearing, delimiting an oil enclosure and having an inner surface centered on the axis, and
- a flange delimiting the oil enclosure and an air enclosure and having an outer surface centered on the axis,
  - the support extending around the flange so that the inner and outer surfaces face each other,
  - the structure defining an oil circuit formed by at least an upstream channel and a downstream channel with reference to a gas flow direction in the turbomachine in operation, and an air circuit formed by at least two upstream channels and two downstream channels,
  - each upstream channel passing through the flange, from the air enclosure to the outer surface by defining an outer opening in the outer surface,
  - each downstream channel extending inside the support and opening out at the inner surface by defining an inner opening located facing the outer opening,
  - each circuit being oriented between the outer and inner openings along a direction comprising a component radial to the axis.

Again, the stator structure is located under the fan disk to support the bearing of the fan shaft. And it requires a transport of at least one fluid (air, oil or the like) in the area located under the fan disk. The stator structure comprises a bearing support and a flange, with the particularity that it is the support that surrounds the flange. In addition, at the interface between the support and the flange, the fluid circuit(s) is/are not oriented along the axis of the turbomachine. As a result, the invention allows reducing the radial space requirement of the stator structure compared to embodiments also requiring transport of at least one fluid in the same area.

Such a stator structure is advantageously completed by the following different characteristics or steps taken alone or in combination:
- the openings of the channels of the air circuit are located upstream of the openings of the oil circuit;

for each circuit, the openings of the channels are distributed in a circumferential direction about the axis;

the openings of the channels of the air circuit are evenly distributed in a circumferential direction about the axis;

the support comprises an upstream segment defining the inner surface and a downstream segment configured to house the bearing, the flange comprising an air groove in the outer surface, the upstream channels of the air circuit opening out into the air groove and an oil groove in the outer surface, the upstream channel of the oil circuit opening out into the oil groove;

the flange comprises three sealing grooves in the outer surface respectively located upstream of the openings of the channels of the air circuit, between the openings of the channels of the air circuit and the openings of the channels of the oil circuit, and downstream of the openings of the channels of the oil circuit, each sealing groove being occupied by a seal in contact with the support;

the channels have an elongated section along the circumferential direction;

the oil circuit being a drain circuit, the structure further defines an oil recovery circuit composed of at least one channel extending inside the support from an inner opening defined in the inner surface by the channel, the inner opening being downstream of the flange and opening out the channel into the oil enclosure along a direction comprising a radial component;

the channel of the recovery circuit has an elongated section along the circumferential direction;

the stator structure comprises, upstream of the flange, a member for fixing the flange to the support;

an error-proofing device arranged to ensure a predetermined angular position of the flange relative to the support.

The invention also relates to a turbomachine comprising a stator structure as presented above.

Advantageously, but optionally, the turbomachine can be supplemented by:

a fan shaft able to drive a fan disk, a fan shaft bearing delimiting the oil enclosure and connecting the stator structure and the shaft, and a deflector delimiting the oil enclosure, able to be driven by the shaft and extending radially towards the opening of the channel of the recovery circuit, an outer radial end of the deflector being located facing the opening so that oil can flow along the deflector towards the channel of the recovery circuit.

Finally, the invention also relates to an aircraft comprising a turbomachine as presented.

DESCRIPTION OF THE FIGURES

Other characteristics and advantages of the invention will emerge from the following description, which is purely illustrative and not limiting, and should be read in relation to the appended drawings in which:

FIG. 1 already discussed, is a schematic representation of a turbomachine.

FIG. 2 is a schematic representation of the area of a turbomachine located between the fan disk and the speed reduction gearbox.

FIGS. 3, 4A and 4B are schematic representations of a stator structure according to the invention.

FIGS. 5, 6 and 7 are details of cutouts of the stator structure from different angles.

DETAILED DESCRIPTION OF THE INVENTION

FIG. 2 is a schematic representation of the area of a turbomachine located between the fan disk 2 and the speed reduction gearbox 12. A stator structure 22 rigidly linked to the stator 14 of the turbomachine extends about the axis Δ. In the direction radial to the axis Δ, the stator structure 22 does not extend from the axis Δ, so that the stator structure 22 leaves the axis Δ free. In the axial direction of the axis Δ, at least part of the stator structure 22 is located between the fan disk 2 and the bearing P1.

Bearing Support

The stator structure 22 comprises a bearing support 50 represented in FIG. 3.

The bearing support 50 comprises an upstream segment 50A and a downstream segment consisting of a central portion 50C and an external portion 50B.

In this description, the terms upstream and downstream are defined with reference to a gas flow direction in the turbomachine in operation.

The upstream segment 50A of the bearing support 50 is located upstream of the downstream segment, of the external portion 50B and of the central portion 50C. It is located in the extension of the external portion 50B and is secured thereto.

The upstream segment 50A has an approximately annular shape extending about the axis Δ.

It has an inner surface 59, represented in FIG. 4B, which extends about the axis Δ. The inner surface 59 is of substantially cylindrical shape and is centered on the axis Δ.

It defines a housing in the upstream segment 50A of the bearing support 50, the housing being open towards the upstream of the bearing support 50.

The central portion 50C is adapted to house a bearing P1 ensuring a pivot connection about the axis Δ of a fan shaft 13 with the stator structure 22.

A lubricating member 24 can be fixed to the central portion 50C in the vicinity of the bearing P1. It can be oriented so as to diffuse the lubricant 26 in the direction of the bearing P1.

The external portion 50B of the downstream segment of the bearing support 50 extends around the central portion 50C relative to the axis Δ. It has a conical shape that deviates from the axis Δ in the downstream direction.

The external portion 50B is secured to the central portion 50C.

The bearing support 50 comprises several channels.

Each channel can extend in a radial plane comprising the axis Δ.

Each channel passes in the upstream segment 50A then in the external portion 50B of the downstream segment of the bearing support 50.

Each channel opening out at the inner surface 59 and defines an inner opening therein.

Each channel may have an elongated oblong section along a direction circumferential to the axis. In other words, in a plane orthogonal to the axis, the channel has an elongated section in the direction perpendicular to the radial direction.

Each inner opening can in the same way have an elongated oblong shape along a direction circumferential to the axis.

Particularly, the channel may have a section that is more elongated in the circumferential direction than in the radial direction. This elongation is chosen within the limit of the pressure drop laws known to those skilled in the art that this entails, to the benefit of the radial compactness of the bearing support.

These complex shapes can be obtained by foundry or additive manufacturing.

Each channel is oriented at the level of the inner opening along a direction comprising a component radial to the axis, that is to say a non-zero radial component. In other words, at the level of the inner opening, the direction followed by the channel is the direction radial to the axis, or a direction having an angle different from a right angle relative to the direction radial to the axis.

The direction of the channel at the level of the inner opening can be defined for example by a tangent to the channel determined at the level of the inner opening. For this purpose, it is possible to define geometric centers of sections of the channel, and a curved line that passes through these centers. Such a curved line allows defining the direction of the channel. The direction of the channel at the level of the inner opening can be defined for example by the tangent to this curved line determined at the level of the inner opening.

Away from the inner opening, the channel may have a bend downstream and extend along the direction of the axis downstream.

The channels can be divided into several groups of channels according to the functions to be performed, the channels of the same group communicating with each other.

The channels of the same group define inner openings that are aligned in a direction circumferential to the axis. They can be evenly distributed about the axis, that is to say the angular deviation between two successive openings is substantially constant, that is to say constant to plus or minus 10%. In addition, the inner openings of channels of the same group can have the same dimensions.

In the following description, three groups of channels are presented. There is a first group of channels called pressurizing air channels 54, a second group of channels called oil drain channels 55 and a third group of channels called oil recovery channels 57.

At least one between the group of pressurizing air channels 54 and the group of channels called oil drain channels 55 is present in the embodiment, but it is not necessary for these two groups to be simultaneously present in the stator structure. Particularly, the stator structure can be produced without the first group of channels called pressurizing air channels 54.

The first group of the pressurizing air channels 54 defines inner openings that may be located upstream in the inner surface 59 of inner openings defined by the oil channels 55.

It should be noted that the second group of oil drain channels 55 can optionally include a single channel. In this case, the inner opening of the drain channel is located below the axis of the turbomachine relative to the vertical when the turbomachine is installed in an aircraft. The inner opening of the drain channel is located under the axis of the turbomachine. It is located in line with the axis or nearly in line with the axis. For example, the angle formed in a vertical plane orthogonal to the axis of the turbomachine, between the vertical passing through the axis and the direction passing through the axis and the inner opening can be comprised between −10° and +10°.

The third group of channels 57 formed by the oil recovery channels defines openings that are located further downstream than the inner openings defined by the oil drain channels.

It should be noted that the bearing support can comprise a single oil recovery channel. In this case, the opening of the channel is located below the axis of the turbomachine relative to the vertical when the turbomachine is installed in an aircraft. For example, the angle formed in a vertical plane orthogonal to the axis of the turbomachine, between the vertical passing through the axis and the direction passing through the axis and the opening of the channel can be comprised between −10° and +10°.

As a variant, the oil recovery channel can be divided into three sub-channels in the vicinity of the inner surface. Each sub-channel opens out into the inner surface according to three sub-openings. This is advantageous for the fluid flow even in case of roll of the aircraft.

It has been schematically represented in FIG. 3 different flows in different groups of channels on the same view and in the same plane. The positions in the axial and radial direction of these channels in FIG. 3 have been represented more precisely than their positions in the circumferential direction.

Indeed, the groups of channels are in fact angularly distributed about the axis of the turbomachine so as not to overlap. The radial plane comprising the axis Δ in which a channel extends is different from one channel to another.

FIG. 4B shows in a perspective view an example of pressurizing air channels 54, oil drain channels 55 and oil recovery sub-channels 57 angularly offset about the axis of the turbomachine.

Flange

The stator structure 22 comprises a flange 60 which has an annular shape centered on the axis Δ. The flange 60 defines an outer surface 69 which extends about the axis Δ and which is substantially cylindrical and centered on the axis Δ.

The outer surface 69 has a diameter slightly smaller than the diameter of the inner surface 59, so that the flange can be arranged in the housing of the bearing support 50. FIGS. 4A and 4B represent the flange 60 respectively in the housing and outside the housing.

The bearing support 50 extends around the flange 60 with reference to the axis.

The inner surface 59 and the outer surface 69 face each other.

The inner surface 59 has an axial length, measured in the direction of the axis Δ, smaller than an axial length of the housing. The bearing support 50 also extends further upstream of the inner surface 59 with reference to the axis.

The flange 60 comprises a surface S1 located at the downstream end of the external surface 69 of the flange. The flange is arranged in the housing of the bearing support 50 so that the downstream surface S1 is located upstream of the inner openings of the oil recovery channels 57 of the bearing support. In this way, the flange 60 does not cover the inner openings of the oil recovery channels 57.

The flange 60 comprises several channels.

Each channel extends in a radial plane comprising the axis Δ.

Each channel passes through the flange 60 from the external surface 69 to an inner radial surface.

Since the channels of the flange 60 are located globally upstream of the channels of the bearing support, they can be referred to as "upstream channels" in comparison with the channels of the support which are referred to as "downstream channels". Each upstream channel opens out at the outer surface 69 and defines therein an outer opening.

Each upstream channel can have an elongated oblong section along the circumferential direction. In other words, in a plane orthogonal to the axis, the upstream channel has an elongated section in the direction perpendicular to the radial direction.

Each outer opening can likewise have an elongated oblong shape along the circumferential direction.

Particularly, the upstream channel can have a more elongated section in the circumferential direction than in the radial direction. This elongation is chosen within the limit of the pressure drop laws known to those skilled in the art that this entails, to the benefit of the radial compactness of the bearing support These complex shapes can be obtained by foundry or additive manufacturing.

Each upstream channel is oriented at the level of the outer opening along a direction comprising a radial component, that is to say a non-zero radial component. In other words, at the level of the outer opening, the direction followed by the upstream channel is the direction radial to the axis, or a direction having an angle different from a right angle relative to the direction radial to the axis. The direction of the upstream channel at the level of the outer opening can be defined for example by a tangent to the upstream channel at the level of the outer opening, particularly the tangent to the curved line defined by the geometric centers of sections of the upstream channel.

This direction followed by the upstream channel at the level of the outer opening can be the radial direction.

The upstream channels can be distributed into two groups, the upstream channels of the same group can communicate with each other.

The upstream channels of the same group define outer openings which are aligned in the circumferential direction. They can be evenly distributed about the axis that is to say the angular deviation between two successive outer openings is substantially constant that is to say constant to plus or minus 10%. In addition, the outer openings of upstream channels of the same group may have the same dimensions.

A first group of upstream channels called upstream pressurizing air channels 64 define outer openings that can be located upstream in the outer surface 69 of outer openings defined by the upstream channels called upstream oil drain channels 65 of the second group of upstream channels.

At least one of these groups of channels is present in the embodiment, but not all groups of channels need to be present in the stator structure. Particularly, the stator structure can be produced without the first group of channels called upstream pressurizing air channels 64.

The arrangement of the flange in the housing of the bearing support is such that:
the outer openings of the upstream air channels 64 are located facing the inner openings of the downstream air channels 54, and
the outer openings of the upstream oil channels 65 are located facing the inner openings of the downstream oil drain channels 55.

The angular position of the flange is fixed by an error-proofing device or device 58, to follow the correct position of the drain channel which must be in the lower part.

A pair formed of an outer opening and of an inner opening facing each other defines a flow direction which comprises a component radial to the axis. The flow direction is the direction radial to the axis, or a direction presenting an angle different from a right angle relative to the direction radial to the axis The direction followed by the upstream channel at the level of the outer opening and the direction followed by the downstream channel at the level of the inner opening can be identical and thus define the flow direction between the outer opening and the inner opening.

The direction followed by the upstream channel at the level of the outer opening and the direction followed by the downstream channel at the level of the inner opening may be different. The flow direction corresponds to a direction comprised between the direction of orientation of the downstream channel at the level of the inner opening and the direction of orientation of the upstream channel from the outer opening.

The flange 60 can comprise three sealing grooves.

A first sealing groove 61 can be located upstream of the outer openings of the upstream air channels 64.

A second sealing groove 62 can be located between the outer openings of the upstream air channels 64 and the outer openings of the upstream oil drain channels 65.

A third sealing groove 63 can be located downstream of the outer openings of the upstream air channels 65.

Each sealing groove can be annular, centered on the axis and defined in the outer surface 69.

Each sealing groove can be opened in the direction of the bearing support 50.

Each sealing groove is adapted to be occupied by a seal 80, for example of the O-ring type, which is in contact with the bearing support 50.

In the presence of these seals 80:
the passages between the upstream air channels and the downstream air channels are isolated from the other channels, and
the passages between the upstream oil drain channels and the downstream oil drain channels are isolated from the other channels.

The flange can also include an air groove in the outer surface, the upstream air channels opening out into the air groove.

It can also include an oil groove in the outer surface, with the upstream drain channels opening out into the oil groove.

The upstream air channels 64 can be constantly oriented along a direction radial to the axis.

The upstream air channels 64 open out into the inner radial surface of the flange 60 and define air openings therein. The air openings can be aligned in the circumferential direction. They can be evenly distributed about the axis.

The upstream oil drain channels 65 can be oriented along an oblique direction relative to the axis so that the upstream drain channels 65 approach the axis Δ in the upstream direction.

The upstream drain channels 65 open out into the inner radial surface of the flange 60 and define drain openings therein. These can be aligned in the circumferential direction. They can be evenly distributed about the axis.

The air openings and the drain openings can be aligned in the same direction circumferential to the axis. In this case, it is possible to use the following configuration in which the flange comprises:
a single upstream drain channel 65 which defines an inner drain opening located under the axis of the turbomachine relative to the ground;
three upstream air channels 64 which define three inner air openings evenly distributed about the axis with an air opening above the axis of the turbomachine relative to the ground. This air opening is for example located in line with the axis above the axis, that is to say diametrically opposite to the drain opening.

It should be noted that the second group of upstream drain channels can optionally include a single channel. This is in particular the case when the bearing support comprises only one downstream drain channel.

It is possible to fix upstream of the flange 60 a tachometer 23. The latter can be oriented in the radial direction so as to measure the speed of rotation of the fan shaft 13.

Fixing of the Flange to the Bearing Support

The stator structure 22 comprises a member 70 for fixing the flange 60 to the bearing support 50. This member can be an annular part centered on the axis.

The bearing support can comprise a rim S3 which is a surface located upstream of the inner surface 59. The rim S3 is a vertical surface of annular shape which extends radially away from the axis of the turbomachine from the inner surface 59.

The flange can comprise a collar S2 located upstream of the outer surface 69 and radially protruding away from the axis from the outer surface 69.

The collar S2 is in abutment against the rim S3.

The fixing member 70 can be a nut screwed into the upstream segment 50A of the bearing support 50. An inner thread centered on the axis can be made in the upstream segment 50A upstream of the rim S3, and upstream of the collar S2. The fixing member is placed thanks to the inner thread upstream of the collar S2. The latter is bearing on the downstream side against the rim S3 and on the upstream side against the fixing member 70.

A nut axial lock bushing 74 and a nut retainer 72 are able to resist a rotation of the nut relative to the bearing support to prevent the nut from accidentally loosening. The nut retainer 72 is a washer with outer teeth 72A and inner teeth 72B. The outer teeth 72A cooperate with notches of the nut 70 and the inner teeth 72B with notches of the flange 60. The nut retainer 72 is installed after tightening of the nut 70, and held in place by the installation of the axial lock bushing 74, which may for example be an elastic ring, in a groove of the nut 70.

As a variant, the flange 60 does not include a collar S2 at its upstream end and is in abutment in the bearing support on the side of its downstream end. At the upstream end of the flange, an annular slot is made in the bearing support. The slot is dug in the inner surface 59 and it is open in the direction of the axis. The fixing member 70 is formed of two half-bushings and a retaining ring. The two half-bushings occupy the slot so as to hold the flange 60 against the bearing support 50.

The retaining ring can be fixed to the flange so as to hold the half-bushings in the slot. It can be fixed to the flange 60 by screws mounted in tapped holes of the flange 60.

The stator structure 22 can comprise an error-proofing device 58 arranged to ensure a predetermined angular position of the flange relative to the bearing support during the mounting of the stator support. The error-proofing device 58 allows guaranteeing, during the mounting, a precise angular position of the flange 60 relative to the bearing support 50.

The error-proofing device 58 can in particular be an angular mounting foolproofing means known to those skilled in the art, such as for example a tenon/notch system or radial lugs disposed on the bearing support 50 in correspondence to notches in the flange 60. The notches and the lugs define angular sectors of determined radial extent. The error-proofing device 58 can for example comprise notches disposed downstream of the flange, on the downstream surface S1 of the flange and orthogonal to the axis Δ. The notches disposed on the surface S1 are in contact and collaborate with tenons carried by the bearing support. More specifically, the tenons can protrude from the surface 51 of the bearing support, the surface 51 being orthogonal to the axis and facing the surface S1.

Fan Shaft

The fan shaft 13 passes through the stator structure which leaves the axis of the turbomachine free. The fan shaft 13 extends upstream of the stator structure where the shaft is connected to the fan disk 2.

At the level of the flange, the fan shaft can have two annular portions which extend about the axis.

The first portion 15 extends about the axis upstream of the drain openings and air openings.

It can in particular comprise a toothed upstream end 25. This upstream end 25 can be located facing the tachometer 23. It collaborates with the tachometer to allow a measurement of a speed of rotation of the fan shaft.

The first annular portion 15 can also comprise wipers 16 of a first dynamic labyrinth seal J1. The flange 60 can comprise an annular protrusion 32 which extends axially in front of the wipers so as to form the dynamic seal J1. The annular protrusion 32 can include a groove receiving an abradable material 34 opposite the wipers 16. The first dynamic seal J1 is located upstream of the drain openings and air openings.

A second annular portion 17 of the fan shaft 13 extends about the axis downstream of the drain openings and air openings.

The second annular portion 17 can interact with a portion 30 of the flange 60 so as to form a second dynamic seal J2. The second dynamic seal J2 is located downstream of the drain openings and air openings. The second dynamic seal J2 can be a segmented radial seal (or SRS) for example comprising carbon. This seal can be protected from the oil by a downstream gimlet, the gimlet being carried by the portion 30 of the flange 60.

The second annular portion can comprise further downstream of the second dynamic seal J2 a deflector 28 which extends radially away from the axis towards the inner openings of the oil recovery channels 57.

The deflector 28, secured to the fan shaft 13, is able to be driven by the fan shaft 13.

The deflector 28 can comprise an outer radial end 29 located facing the opening of the oil recovery channel(s). The outer radial end radially extends towards the opening of the oil recovery channel(s) and perpendicularly to this opening.

Downstream of the second dynamic seal J2, the bearing support 50 and the flange are spaced apart from the fan shaft 13. This space defines an enclosure, called oil enclosure H2. The recovery channel(s) 57 of the bearing support 50 open out at the inner surface 59 in this oil enclosure H2.

The bearing P1 and the lubricating member 24 delimit the perimeter of the oil enclosure H2. The deflector 28 also delimits this perimeter.

Between the two dynamic seals J1 and J2, the flange 60 is spaced apart from the fan shaft 13. This space defines an enclosure, called air enclosure A2.

The upstream air channels 64 and the upstream drain channel(s) 65 are in communication with the air enclosure A2. Each upstream channel passes through the flange 60 from the air enclosure A2 to the outer surface.

The air enclosure A2 is separated from the oil enclosure H2 by the second dynamic joint J2.

The space located upstream of the first dynamic seal J1 defines an enclosure called fan enclosure A1.

Operation

In operation, the fan shaft 13 rotates about the axis and the stator structure 22 remains stationary. The first and second dynamic seals isolate the oil enclosure H2 and the air enclosure A2.

The dismountable and compact flange 60 allows easy access to the second dynamic seal J2, which is a wear part. It also allows sealing the oil enclosure H2 with regard to the cavity of the disk containing air which is not pressurized (substantially at the ambient pressure of the fan).

When lubricant—or oil—is projected towards the bearing P1 by the lubricating member, the lubricant occupies the oil enclosure H2. It is necessary to recycle this lubricant or this oil.

The deflector 28 is in particular used to orient the lubricant which occupies the oil enclosure towards the recovery channel(s) 57. The lubricant, along the path referenced 27 in FIG. 6 runs along the deflector 28 away from the axis and passes through the recovery channels 57.

The outer radial end 29 of the deflector 28 is located in line with the opening of the oil recovery channel(s) so that the oil flows along the deflector towards the oil recovery channel.

The lubricant follows the recovery channel(s) 57 for later reuse.

The recovery channel(s) 57 define an oil or lubricant recovery circuit. The oil recovery circuit includes at least one oil recovery channel located in line with the axis or nearly in line with the axis. As a variant, the oil recovery channel located under the axis of the turbomachine can be divided into three sub-channels in the vicinity of the inner surface. Each sub-channel opens out into the inner surface according to three sub-openings. This is advantageous for the fluid flow even in case of roll of the aircraft.

The air enclosure A2 is separated from the oil enclosure H2 by the second dynamic seal J2, but it is possible that the oil present in the oil enclosure passes through the second dynamic seal and occupies the air enclosure A2, in case of failure of the dynamic seal J2 or in some airplane attitudes such as a nose-down attitude.

This oil present in the air enclosure can then be discharged from the air enclosure A2 through the upstream drain channel 65. The oil is transported from this channel to the downstream drain channel 55 through the outer surface 69 and the inner surface 59.

The upstream drain channel 65 and the downstream drain channel 55 define an oil circuit or an oil drain circuit able to discharge the oil present in the air enclosure A2. The dotted line in FIG. 7 represents the path of the oil extracted from the air cavity A2 by the drain circuit.

The oil drain circuit may optionally include a single upstream drain channel/downstream drain channel pair. The inner opening and the outer opening are then located below the axis of the turbomachine relative to the ground.

The air enclosure A2 is supplied with air to ensure a sufficiently high-pressure therein. The enclosure A2 is pressurized so that the oil enclosure H2 is under higher pressure than the fan enclosure A1 in which the fan disk is located. In this way, the pressure difference between the enclosure A2 and the enclosure H2 is low, which improves the tightness of the dynamic seal J2.

In the configuration where the flange comprises a single upstream drain channel 65 and three upstream air channels 64, if oil is present in the air enclosure A2, this oil naturally flows towards and through the inner drain opening in the lower part. As the three inner air openings are located higher than this drain opening, the oil cannot reach them due to the force of gravity. In addition, these air openings blow air, which even more so prevents oil from entering them.

The air is routed towards the enclosure A2 via an air circuit formed of the downstream air channels 54 and the upstream air channels 64. The dotted line in FIG. 5 represents the path of the air routed by the ventilation circuit.

The ventilation circuit can include 3 or 4 pairs of downstream/upstream air channels. These pairs are angularly distributed as evenly as possible, in order to homogenize in the circumferential direction the pressure at the level of the first and second labyrinth seals J1 and J2 located at the end of the enclosure.

The flange 60 allows the mounting of the first dynamic seal J1. It also allows defining an air enclosure A2 separated from the fan enclosure A1 and sealing the air enclosure A2.

At least one among the oil drain circuit and the ventilation circuit is present in the embodiment, but it is not necessary for the two circuits to be simultaneously present in the stator structure. Particularly, the stator structure can be produced without the ventilation circuit.

Technical Effects

In the stator structure 22, the bearing support 50 and the flange 60 are arranged so as to ensure a fixing of one to the other upstream of the flange, the bearing support surrounding the flange. This allows a fixing by mechanical stress in the axis of the turbomachine. This also allows a fixing which fits within the outside diameter of the upstream portion of the bearing support 50. An arrangement in which the downstream end of the flange is in abutment against the upstream end of the bearing support would require a fixing of these parts at their interface, which would lead to greater radial space requirement around these two parts.

The bearing support 50 and the flange 60 are arranged so that, at the interface between an upstream channel and a downstream channel in communication with each other, the direction of the fluid circuit formed by these channels is the direction radial to the axis, or a direction presenting an angle different from a right angle relative to the direction radial to the axis. The fluid circuit is directed at this location in a direction comprising a non-zero component along a direction radial to the axis. This allows sealing the circuit at this interface by using two seals oriented orthogonally to the axis, one seal being located upstream of the interface and one seal being located downstream. For example, it is possible to use two annular seals centered on the axis. This arrangement allows reducing the radial space requirement compared to an arrangement where the direction of the fluid circuit formed by the downstream/upstream channels is the direction of the axis of the turbomachine at the interface between the downstream/upstream channels: it would be then necessary to place the seal around the interface.

The stator structure allows particularly reducing the radial space requirement compared to arrangements where, between the flange and the bearing support, a clamp is used to ensure on the one hand the sealing of the different ventilation, drain and recovery circuits and on the other hand the fixing between these two parts. Such a stator structure can be used in a geared motor, but it can also be applied to a motor of the Direct Drive type that is to say without reduction gear.

In the stator structure 22, the bearing support 50 and the flange 60 can have channels, particularly the air channels, having sections in a plane orthogonal to the axis of elongated oblong shape in the circumferential direction. The radial space requirement of the different circuits integrated into the bearing support can thus be reduced. This particular shape of the channels, when complying with the equivalence formulae such as the hydraulic diameter or the equivalent diameter, known to those skilled in the art, does not generate a pressure drop in the circuits.

The bearing support 50 and the flange 60 are arranged so that the oil recovery circuit does not pass through the flange. Only the bearing support is crossed by the oil recovery channels. This arrangement allows saving radial space requirement compared to situations where the flange is crossed by the oil recovery circuit.

The radial clearance between the fan disk 2 and the bearing support 50 is denoted J in FIG. 2. It can reach a length greater than 20 millimeters. It can be twice as large as for arrangements using a clamp to ensure on the one hand the sealing of the different air and oil circuits and on the other hand the fixing between the flange and the bearing support.

The radial space made available by the stator structure can be used to improve the hub ratio of the fan to the benefit of the overall performance of the engine, while maintaining an acceptable margin vis-à-vis the potential deformations of the parts during an engine event such as a fan blade out.

The invention claimed is:

1. A stator structure for a turbomachine, the stator structure comprising:
   a support adapted to house a fan shaft bearing, the support delimiting an oil enclosure, and
   a flange delimiting the oil enclosure and an air enclosure, the stator structure extending about an axis, the axis being the axis of the turbomachine,
   the support having an inner surface centered on the axis,
   the flange having an outer surface centered on the axis,
   the support extending around the flange so that the inner surface and the outer surface face each other,
   the stator structure defining an oil circuit, the oil circuit comprising at least an upstream channel and a downstream channel, the terms upstream and downstream being defined with reference to a gas flow direction in the turbomachine in operation, and the stator structure defining an air circuit comprising at least two couples of an upstream pipe and a corresponding downstream pipe,
   each upstream channel passing through the flange, from the air enclosure to the outer surface by defining an outer opening of the upstream channel in the outer surface,
   each upstream pipe passing through the flange, from the air enclosure to the outer surface by defining an outer opening of the upstream pipe in the outer surface,
   each downstream channel extending inside the support and opening out at the inner surface by defining an inner opening of the downstream channel, the inner opening of the downstream channel facing the outer opening of the upstream channel,
   each downstream pipe extending inside the support and opening out at the inner surface by defining an inner opening of the downstream pipe, the inner opening of the downstream pipe facing the outer opening of the corresponding upstream pipe,
   the oil circuit being oriented between the outer opening of the upstream channel and the inner opening of the downstream channel along a direction comprising a component radial to the axis,
   the air circuit being oriented between the outer opening of an upstream pipe and the inner opening of the corresponding downstream pipe along a direction comprising a component radial to the axis.

2. The stator structure according to claim 1, wherein, for each couple, the outer opening of the upstream pipe and the inner opening of the corresponding downstream pipe are located upstream of the outer opening of the upstream channel and the inner opening of the downstream channel.

3. The stator structure according to claim 1 comprising at least two upstream channels and two downstream channels, the outer openings of the upstream channels and the inner openings of the downstream channels are distributed in a circumferential direction about the axis, wherein the outer openings of the upstream pipes and the inner openings of the downstream pipes are distributed in a circumferential direction about the axis.

4. The stator structure according to claim 1, wherein the outer openings of the upstream pipes and the inner openings of the downstream pipes are evenly distributed in a circumferential direction about the axis.

5. The stator structure according to claim 1, wherein the support comprises:
   an upstream segment defining the inner surface and
   a downstream segment configured to house the bearing, the flange comprising:
   an air groove in the outer surface, the upstream pipes of the air circuit opening out into the air groove and
   an oil groove in the outer surface, the upstream channels of the oil circuit opening out into the oil groove.

6. The stator structure according to claim 1, wherein the flange comprises three sealing grooves in the outer surface respectively located upstream of the outer openings of the upstream pipes, between the outer openings of the upstream pipes and the outer opening of the upstream channel, and downstream of the outer opening of the upstream channel, each sealing groove being occupied by a seal in contact with the support.

7. The stator structure according to claim 1, wherein the upstream channel, the downstream channel, the upstream pipes and the downstream pipes have an elongated section along the circumferential direction.

8. The stator structure according to claim 1, wherein, the oil circuit being a drain circuit, the stator structure further defines an oil recovery circuit composed of at least one duct extending inside the support from an inner opening of the duct defined in the inner surface by the duct, the inner opening of the duct being located downstream of the flange, the inner opening of the duct opening out the duct into the oil enclosure along a direction comprising a radial component.

9. The turbomachine comprising a stator structure according to claim 8 and further comprising:
   a fan shaft able to drive a fan disk,
   a fan shaft bearing delimiting the oil enclosure and connecting the stator structure and the shaft, and
   a deflector delimiting the oil chamber, the deflector being configured to be driven by the shaft and the deflector extending radially towards the inner opening of the duct of the recovery circuit,
   an outer radial end of the deflector being located facing the inner opening of the duct so that oil can flow along the deflector towards the duct of the recovery circuit.

10. An aircraft comprising at least one turbomachine according to claim 9.

11. The stator structure according to claim 8, wherein the duct of the recovery circuit has an elongated section along the circumferential direction.

12. The stator structure according to claim 1, comprising, upstream of the flange, a member for fixing the flange to the support.

13. The stator structure according to claim 1 comprising an error-proofing device arranged to ensure a predetermined angular position of the flange relative to the support.

14. A turbomachine comprising a stator structure according to claim 1.

15. An aircraft comprising at least one turbomachine according to claim 14.

* * * * *